(12) United States Patent
Dow et al.

(10) Patent No.: US 6,611,291 B1
(45) Date of Patent: Aug. 26, 2003

(54) APPLIANCE AND METHOD FOR COMMUNICATING AND VIEWING MULTIPLE CAPTURED IMAGES

(75) Inventors: James C. Dow, Fort Collins, CO (US); Dan L. Dalton, Greeley, CO (US); Michael L. Rudd, Fort Collins, CO (US); Karin C. Ruffatto, Fort Collins, CO (US); Daniel Formosa, Montvale, NJ (US); Sandra Nieves, New York, NY (US); Paul Hamburger, New York, NY (US); Michael J. DeVries, Loveland, CO (US); Nancy Shepard, Arvada, CO (US); Modest Khovaylo, Fort Collins, CO (US)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 09/130,081

(22) Filed: Aug. 7, 1998

(51) Int. Cl.[7] ............................................. H04N 5/222
(52) U.S. Cl. ......................... 348/333.01; 348/333.05; 348/333.11; 348/333.02; 348/239; 345/730
(58) Field of Search .................................. 348/213, 232, 348/333.01, 333.02, 333.04, 333.05, 333.11, 239, 299; 345/730, 731, 732, 475, 784, 786

(56) References Cited

U.S. PATENT DOCUMENTS

| | | | | |
|---|---|---|---|---|
| 5,231,512 A | * | 7/1993 | Ebihara et al. | 348/705 |
| 5,640,522 A | * | 6/1997 | Warrin | 345/732 |
| 5,699,125 A | * | 12/1997 | Rzeszewski et al. | 348/565 |
| 5,905,528 A | * | 5/1999 | Kodama | 348/333.02 |
| 6,215,523 B1 | * | 4/2001 | Anderson | 348/333.05 |
| 6,249,316 B1 | * | 6/2001 | Anderson | 348/333.05 |
| 6,292,219 B1 | * | 9/2001 | Fredlund et al. | 348/239 |

FOREIGN PATENT DOCUMENTS

| | | | | |
|---|---|---|---|---|
| WO | WO98/57294 | 12/1998 | | G06K/9/36 |

* cited by examiner

Primary Examiner—Wendy R. Garber
Assistant Examiner—Matthew L Rosendale

(57) ABSTRACT

An appliance is provided for capturing and communicating images to other devices with communication capabilities. An embodiment of the capturing and viewing appliance comprises a photoelement array for acquiring at least a first image data and a second image data, a memory for saving said image data, a processor in communication with the memory, a display in communication with the processor for exhibiting one of the image data, and program code stored in the memory and executed by the processor for viewing one of the image data, the program code comprising a page view software module for viewing the image data on the display of the appliance, and for displaying an animated sequence on the display after ending display of the first image data and before displaying the second image data, wherein the animated sequence is the first image data sliding off the display.

26 Claims, 9 Drawing Sheets

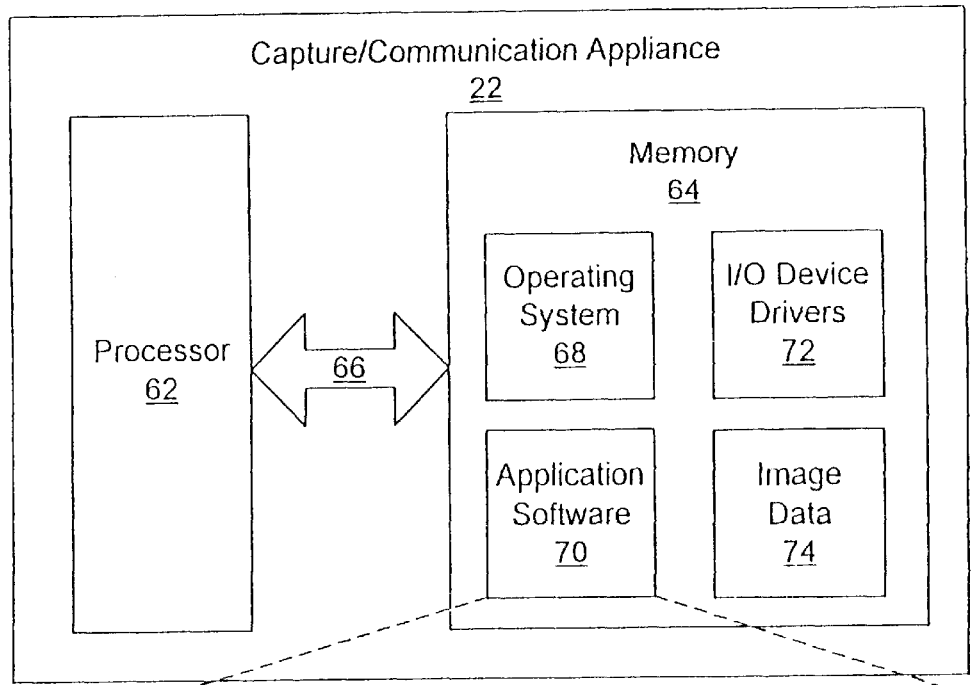
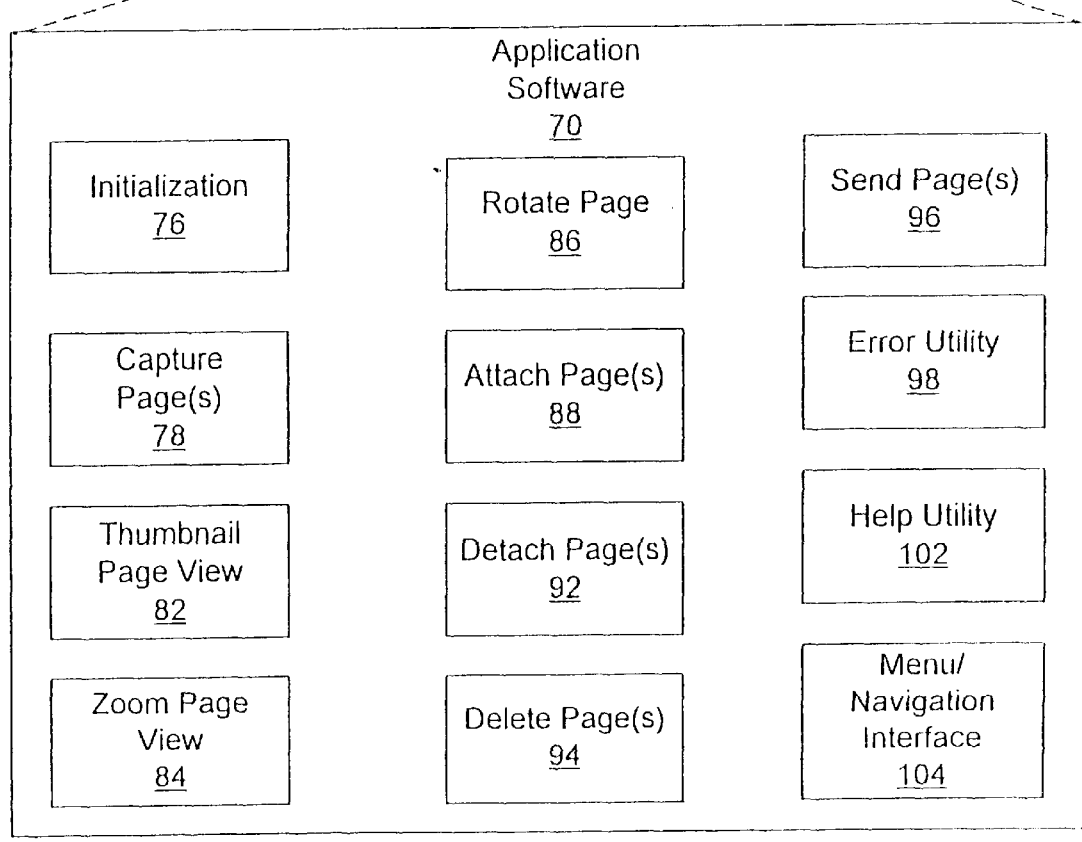
FIG. 2

FIG. 8A                FIG. 8B
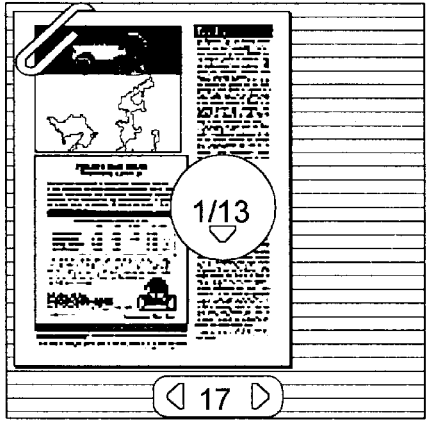
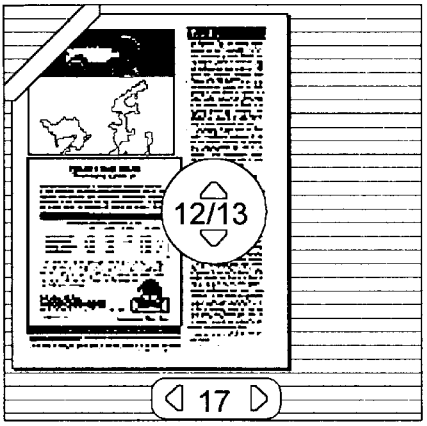
FIG. 9A                FIG. 9B
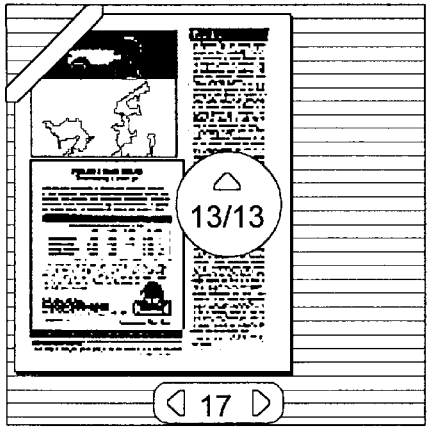
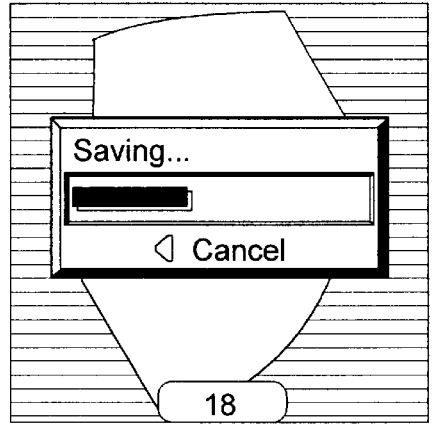
FIG. 9C                FIG. 10

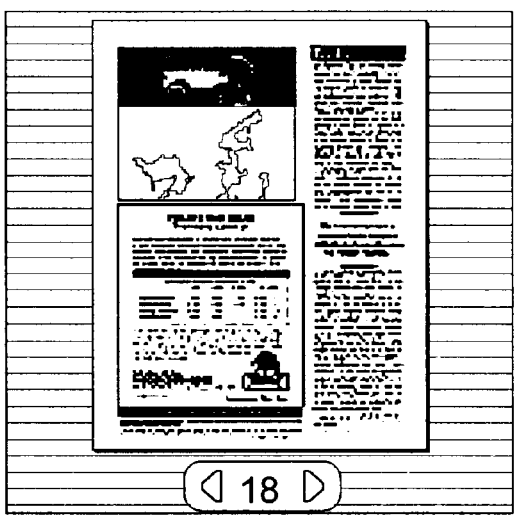 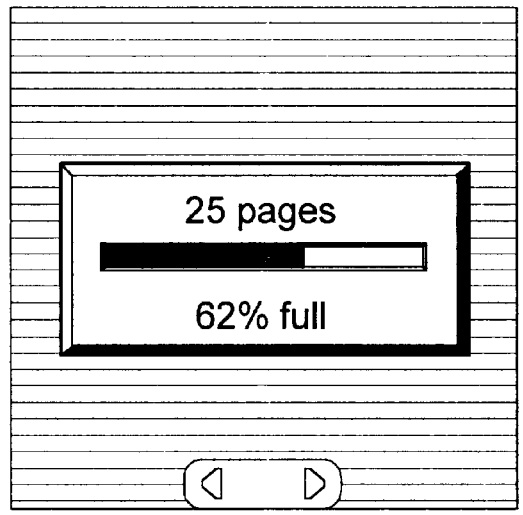
*FIG. 11*  *FIG. 12*

APPLIANCE AND METHOD FOR COMMUNICATING AND VIEWING MULTIPLE CAPTURED IMAGES

CROSS REFERENCE TO RELATED APPLICATIONS

This application is related to U.S. application Ser. No. 09/130,869 entitled "APPLIANCE AND METHOD OF USING SAME HAVING A SEND CAPABILITY FOR STORED DATA", U.S. application Ser. No. 09/130,080 entitled "APPLIANCE AND METHOD OF USING SAME HAVING A USER HELP CAPABILITY", U.S. application Ser. No. 09/130,573 entitled "APPLIANCE AND METHOD OF USING SAME FOR CAPTURING IMAGES", U.S. application Ser. No. 09/130,082 entitled "APPLIANCE AND METHOD OF USING SAME HAVING A DELETE CAPABILITY FOR SAVED DATA", U.S. application Ser. No. 09/130,789 entitled "APPLIANCE AND METHOD OF USING SAME HAVING A CAPABILITY TO GRAPHICALLY ASSOCIATE AND DISASSOCIATE DATA WITH AND FROM ONE ANOTHER", U.S. application Ser. No. 09/130,584 entitled "APPLIANCE AND METHOD FOR NAVIGATING AMONG MULTIPLE CAPTURED IMAGES AND FUNCTIONAL MENUS", U.S. application Ser. No. 09/130,572 entitled "APPLIANCE AND METHOD FOR CAPTURING IMAGES HAVING A USER ERROR INTERFACE", U.S. application Ser. No. 09/131,258 entitled "APPLIANCE AND METHOD FOR VIEWING CAPTURED IMAGES", and U.S. application Ser. No. 09/130,868 entitled "APPLIANCE AND METHOD FOR MENU NAVIGATION", which are filed contemporaneously herewith and are incorporated herein by reference.

BACKGROUND OF THE INVENTION

1. Field of the Invention

The present invention generally relates to the field of digital capturing and, more particularly, relates to a user interface for a portable hand-held capturing appliance for capturing and viewing images through digital scanning or other means of capturing and communicating those images to other devices.

2. Related Art

Intangible information is a vital business asset that can be exploited for competitive advantage if managed properly. In the past fifteen years, improvements in information processing have been achieved primarily from the widespread use of microcomputers in the workplace and their application in local and wide area networks. Through such applications as electronic mail (email) and networked access to document storage servers, the electronic communications market has exploded. Nevertheless, business is still far from reaching a "paperless" workplace. For example, according to a 1993 report by BIS Strategic Decisions (hereinafter BIS), an information technology consulting firm, more than 90 billion documents were created in 1992 and more than 1 trillion copies of those documents were made. Moreover, ad BIS estimated that printing and copying expenses average between 6% and 13% of a typical company's revenue. These statistics illustrate the economic savings available for those businesses that are able to merge paper and technology in a unified information processing strategy.

One tool that has proven useful for translating between paper and electronic information is the digital scanner. Scanner-enabled document distribution endows paper-based documents with the speed and convenience of electronic communications. A desktop scanner or network scanner allows business professionals to scan paper-based documents, manage them effectively and distribute them in a timely fashion. Users can share and distribute information easily by scanning directly to their email or PC fax applications. The growing popularity of fax modems and email is driving the acceptance of scanner-enabled document distribution in offices of all sizes. Fax/modem capabilities, which are available with virtually all modem PCs, enable users to send and receive faxes directly from a computer—at their desk or while traveling—and to check email remotely.

Nevertheless, while scanners are ideal for users who need to disseminate paper-based information to colleagues through PC facsimile and/or email, traditional flatbed scanners lack the convenience and flexibility that users have become accustomed to through such products as notebook computers and cellular phones. Hand-held scanners are an improvement in this regard; however, they are typically dependent on a host computer for displaying the scanned images and for providing power. U.S. Pat. No. 5,550,938 to Hayakawa et al. (hereinafter Hayakawa) discloses a portable image scanner designed to overcome these disadvantages. Specifically, Hayakawa discloses a hand-held cordless image scanner having a display/control screen, a memory for storing scanned images, a self contained power supply and an interface that allows the scanner to be received by a host computer as a memory card for transferring stored images from the scanner to the computer. While Hayakawa's scanner is effective in breaking the dependency on a host computer for image display and power, it still has several drawbacks. For example, Hayakawa's scanner offers no image processing features other than the capabilities of storing or discarding a newly scanned image and reviewing those images that have been stored previously. More advanced image processing would necessarily be done after transfer to a host computer. Moreover, Hayakawa does not offer a graphical user interface (GUI) containing icons and/or animations to assist users in operating their device. Finally, transfer of images is limited to those devices having ports for receiving an external memory card or the capability of reading the scanner memory through a memory card drive.

Accordingly, a heretofore unaddressed need exists in the industry for providing a hand-held image capturing appliance and method that allows users to navigate among multiple captured images, as well as functional menus in the appliance before transfer, and the ability to communicate directly with some other unit such as a computer, printer, or facsimile machine. In addition, the capturing device should provide cordless operation and use a standard interface for transferring images to other devices. A GUI is preferred to assist users, particularly novices, in operating the device.

SUMMARY OF THE INVENTION

The present invention overcomes the inadequacies and deficiencies of the prior art as discussed hereinbefore. The present invention provides an image capturing appliance incorporating a menu/image navigation interface for communicating with and allowing the user to view captured images on the appliance and communicate those captured images to other devices. Specifically, the thumbnail navigation interface and method operates in conjunction with the menu/image navigation interface and method to provide navigation among multiple images. These interfaces facilitate ease of use and hardware simplification and miniaturization of the capturing appliance for seamless integration of the appliance into a consumer's existing tools and processes.

The capturing appliance contains a capturing means such as photocells and a storage means for storing captured images. A processing means is also provided for processing the acquired image and displaying it on a self-contained display of the appliance. Program instructions are provided in the memory of the appliance and allows the user to view multiple captured images in a thumbnail size with the option to view selected areas of the image in a variety of pixel resolutions on the display of the appliance.

The thumbnail navigation interface and method provides a user interface incorporating on-screen icons and directional navigation buttons for designating captured images to be viewed. Animated transitions are also included to communicate navigation among multiple captured images to the user.

The thumbnail navigation interface and method of the present invention have many advantages, a few of which are delineated hereafter, as examples.

An advantage of the thumbnail navigation interface and method of the present invention is that they provide a simple procedure for navigating among multiple captured images on an appliance using functional buttons.

Another advantage of the thumbnail navigation interface and method of the present invention is that they provide a more flexible and user friendly procedure for inspecting multiple captured images on an appliance.

Another advantage of the thumbnail navigation interface and method of the present invention is that they provide a novel way of communicating functionality to the user through the use of animation.

Another advantage of the thumbnail navigation interface and method of the present invention is that they provide for a procedure for navigating among images in an appliance which is simple, easy to learn and efficient.

Another advantage of the thumbnail navigation interface and method of the present invention is that they can be employed in virtually any graphical user interface (GUI).

Other features and advantages of the present invention will become apparent to one with skill in the art upon examination of the following drawings and detailed description. It is intended that all such additional features and advantages be included herein within the scope of the present invention, as is defined by the claims.

BRIEF DESCRIPTION OF THE DRAWINGS

In the accompanying drawings:

FIG. 2 is a high-level block diagram of the internal hardware and software architecture of the appliance illustrated in FIGS. 1A–1D;

FIGS. 8A and 8B illustrate the tools menus displayed on the display screen of FIG. 1A;

FIG. 9A illustrates the first image of an attached group of captured images together with navigational arrow descriptors as displayed on the display screen of FIG. 1A;

FIG. 9B illustrates an image within an attached group of captured images together with navigational arrow descriptors as displayed on the display screen of FIG. 1A;

FIG. 9C illustrates the last image of an attached group of captured images together with navigational arrow descriptors as displayed on the display screen of FIG. 1A;

FIG. 10 illustrates a progress box giving the status of image processing as displayed on the display screen of FIG. 1A;

FIG. 11 illustrates a thumbnail view of a captured image on the display screen of FIG. 1A after image processing as depicted in FIG. 10;

FIG. 12 depicts a memory usage indicator on the display screen of FIG. 1A that provides a status report of memory utilization for the appliance.

DETAILED DESCRIPTION OF THE PREFERRED EMBODIMENT

Figure 1A:
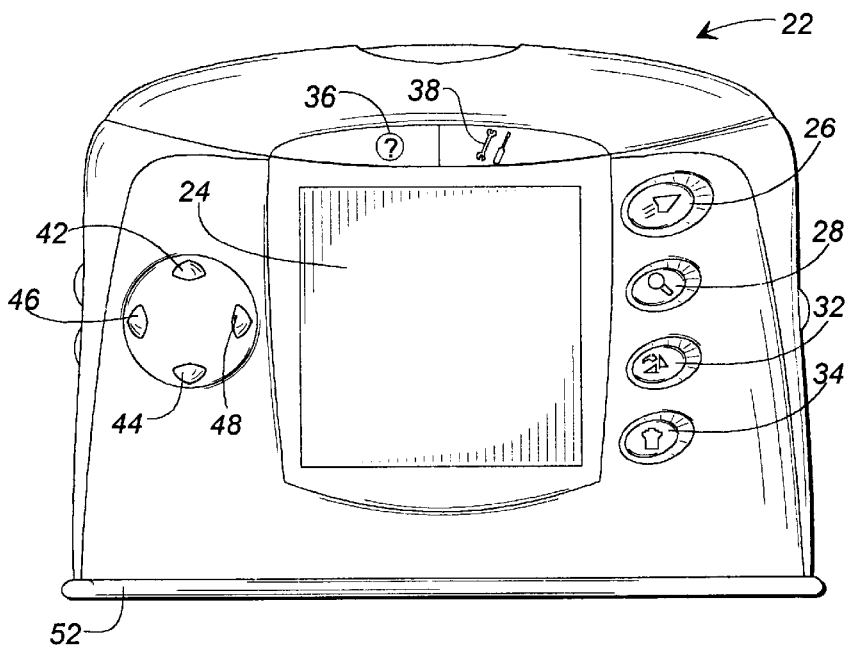
FIG. 1A is an elevation view of the hand-held image capture and communication appliance according to the present invention, which depicts a side of the unit containing the display screen, operation buttons, and navigation buttons.

Reference is now made to the drawings wherein like reference numerals designate corresponding parts throughout these several figures. It should be understood by those skilled in the art that some aspects of the present invention may be practiced on any apparatus for the purposes of viewing multiple images, not limited to apparatuses which include or do not include image capturing capabilities through a photoelement array or scanning. For example, a user may use the thumbnail navigation interface present invention for viewing multiple images or pages on different types of computers and networks, such as the Internet.

Architecture of the Image Capture and Communication Appliance

A portable, hand-held, image capture and communication appliance 22 embodying the principles of the present invention is shown in FIGS. 1A through 1D. Specifically, FIG. 1A depicts one side (i.e., front) of appliance 22, where a flat-panel display 24 along with user operation buttons 26, 28, 32, 34, 36, 38 and user navigation buttons 42, 44, 46, 48 are located. Display 24 is preferably of the flat-panel variety to accommodate the hand size dimensions of appliance 22. Common types of flat-panel displays suitable for use in the present invention include electroluminescent displays, gas plasma discharge displays, liquid crystal displays (LCDs) and field emission displays (FEDs). Display 24 is the means by which information, including captured images, text, icons, and animations, is communicated to the user. The user operation buttons comprise an image send or transmit button 26, an image zoom button 28, an image rotate button 32, an image delete button 34, a help utility button 36 and a tools menu button 38. Send, zoom, rotate, and delete buttons 26, 28, 32 and 34 allow the user to electronically manipulate an image or page that has been scanned into memory through photoelement array 52. Activation of tools button 38 presents the user with a menu that includes possible image operations (e.g., image attachment/grouping, image detachment/ungrouping), changing the mode of appliance 22 (i.e., toggling between text (binary) capture and image (grayscale) capture), calibrating appliance 22, displaying a screen identifying important specifications such as a model number, hardware or software release number, memory usage, selecting a page size for printing, etc., or other user utilities not deserving of a dedicated external button for activation. Help button 36 provides the user with access to both general tutorials, process animation, and how-to instructions on the operation of appliance 22 and context sensitive instruction when requested while another operation or menu is active. The navigation buttons include an up button 42, a down button 44, a left button 46, and a right button 48 and are controlled by the user to steer a course through menu items and to view images or pages that have been captured in memory.

Figure 1B:
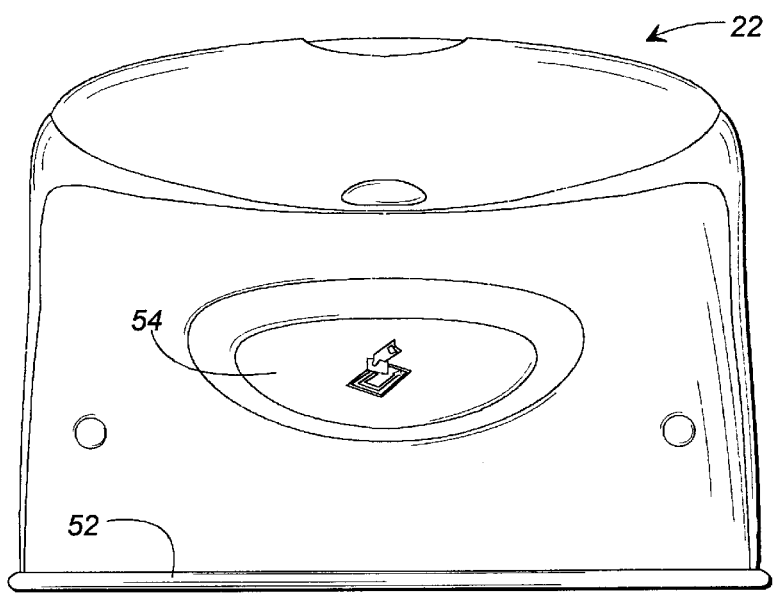
FIG. 1B is an elevation view of the appliance of FIG. 1A depicting the opposing side to that illustrated in FIG. 1A, which contains the capture button for performing an image scan.
Figure 1C:
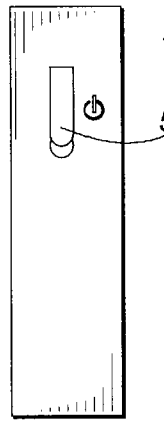
FIG. 1C is an elevation view of the appliance of FIGS. 1A and 1B depicting an end of the unit, which contains the power button.
Figure 1D:
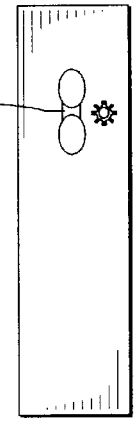
FIG. 1D is an elevation view of the appliance of FIGS. 1A, 1B, and 1C depicting the opposing end to that illustrated in FIG. 1C, which contains a brightness button for adjusting the visual clarity of the display screen.

FIG. 1B shows the side of appliance 22 opposite that illustrated in FIG. 1A (i.e., back). The back side of appliance 22 includes image capture button 54, which is depressed by a user to scan an image through photoelement array 52 and is released once the image is captured. A power switch 56 is included at one end of appliance 22 as shown in FIG. 1C and a contrast control 58 for display 24 is located at the other end of appliance 22 as shown in FIG. 1D. The positioning of the various buttons, power switch 56 and contrast control 58 on appliance 22 as shown in FIGS. 1A through 1D is merely exemplary and can be modified as needed to satisfy the ergonomic requirements of the targeted user community.

Referring now to FIG. 2, the internal architecture of appliance 22 will be described hereafter. Appliance 22 includes a processor 62, which communicates with a memory 64 via address/data bus 66. Processor 62 can be any commercially available or custom microprocessor suitable for an embedded application. Memory 64 is representative of the overall hierarchy of memory devices containing the software and data used to implement the functionality of appliance 22. Memory 64 can include, but is not limited to, the following types of devices: cache, ROM, PROM, EPROM, EEPROM, flash, SRAM, and DRAM. As shown in FIG. 2, memory 64 holds four major categories of software and data used in appliance 22: the operating system 68; the application software 70; the I/O device drivers 72; and the image data 74 generated for each scan. Operating system 68 should be designed for real time embedded applications and, preferably, is relatively compact to make the most efficient use of memory 64. One such example of a real time operating system meeting these criteria is the PSOSYSTEM operating system (pSOSystem® or pSOS®) sold by Integrated Systems, Inc., Santa Clara, Calif., U.S.A., which is used in the preferred embodiment of the present invention. I/O device drivers 72 include software routines accessed through operating system 66 by application software 70 to communicate with devices such as display 24, certain memory components 64 and I/O ports such as a serial port or infra red (IR) port for transferring data to another appliance, device or system. The digital representations of the images captured by appliance 22 is denoted by image data 74. The format used for storing the images should be compatible with application software 70. One common format used for encoding images is the JPEG standard; however, other public or proprietary standards can be used with equal success. In the preferred embodiment, CCITT-G4, which is designed for facsimile usage and black and white images, is used. Finally, application software 70 comprises the control programs that implement the various features of appliance 22. Application software 70 and devices drivers 72 are typically written in a high-level programming language such as C or C++ for development convenience. Nevertheless, some drivers or application modules are sometimes written in assembly or machine language to optimize speed, memory usage or layout of the software in memory. In the preferred embodiment, the present invention uses C language to implement most application software 70 and device drivers 72 and assembly language for the most time-critical sections.

Application software 70 can be broken into several modules corresponding to the various features of appliance 22, as shown in FIG. 2. These software modules include an initialization module 76, a capture page module 78, a thumbnail view module 82, a zoom view module 84, a page rotation module 86, an attach page module 88, a detach page module 92, a delete page module 94, a send page module 96, an error utility module 98, a help utility module 102 and a menu/navigation interface module 104. Note that an image captured in memory is interchangeably referred to herein as a "page" because the image is portrayed in appliance 22 as a physical page of text and/or imagery. A brief overview of each of the aforementioned modules follows hereafter.

Figure 6:
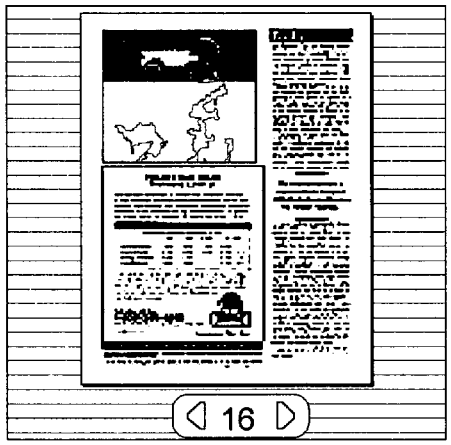
FIG. 6 illustrates a thumbnail view of an image successfully captured and displayed with the license plate at the bottom on the display screen of FIG. 1A.
Figure 7A:
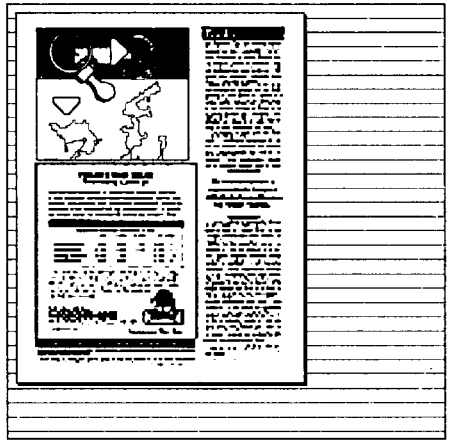
FIG. 7A illustrates the thumbnail view of FIG. 6 which has been grouped as displayed on the display screen of FIG. 1A, together with a metaphorical icon with directional arrows.
Figure 7B:
FIG.7B illustrates the thumbnail view and metaphorical icon of FIG. 7A on the display screen of FIG. 1A, where the metaphorical icon has been moved across the thumbnail image.
Figure 7C:
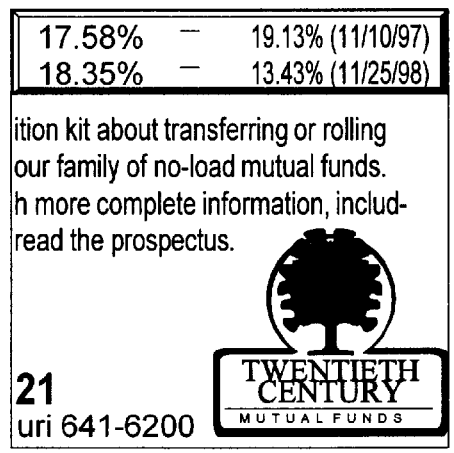
FIG. 7C illustrates the magnified area designated by the metaphorical icon of the thumbnail view of FIG. 7B as displayed on the display screen of FIG. 1A.

Initialization module 76 contains the boot software that is invoked when appliance 22 powers up. This module works closely with operating system 68 and device drivers 72 to perform any hardware initialization for processor 62, memory devices 64, display 24, and software initialization for global resources, such as message queues and buffers, system tasks, and memory partitions. Capture page module 78 controls the acquisition of images through photoelement array 52 and their conversion into a suitable format for storage in memory 64. Thumbnail view module 82 provides the default visual for pages and icons shown on display 24. The thumbnail view presents an entire page on display 24 as illustrated in FIG. 6. This module shall be discussed in more detail hereinafter. Zoom view module 84 allows the user to magnify a portion of a page as illustrated in FIG. 7C. Page rotation module 86 allows the user to rotate a page either in thumbnail or zoom view in 90° increments. Attach page module 88 allows the user to logically join pages together to form a group of pages that can deleted, sent or viewed as an individual unit, but not rotated or zoomed. Rotation and zoom always apply only to the current page. Conversely, detach page module 92 allows the user to separate a page or pages from a previously formed group. Delete page module 94 allows the user to purge a page or group of pages from memory 64. Send page module 96 allows the user to transfer a page or group of pages to another appliance, device or system through the serial or IR communication ports of appliance 22. Error utility module 98 provides notification to the user when the user attempts an invalid operation. Help utility module 102 provides the user, in real time, with general instructions and animations on operating appliance 22 and context sensitive instructions for performing a specific operation. Lastly, menu/navigation interface module 104 provides the user with graphical menus for performing various operations and processes the user's response thereto. Moreover, menu/navigation interface module 104 responds to navigation buttons 42, 44, 46, and 48 that allow the user to steer a course through the graphical menus and works in conjunction with the thumbnail view module 82 to view the stored pages. Portions of the operation of menu/navigation interface module 104 will be discussed hereinafter in describing the operation of the thumbnail view module 82.

Figure 3:
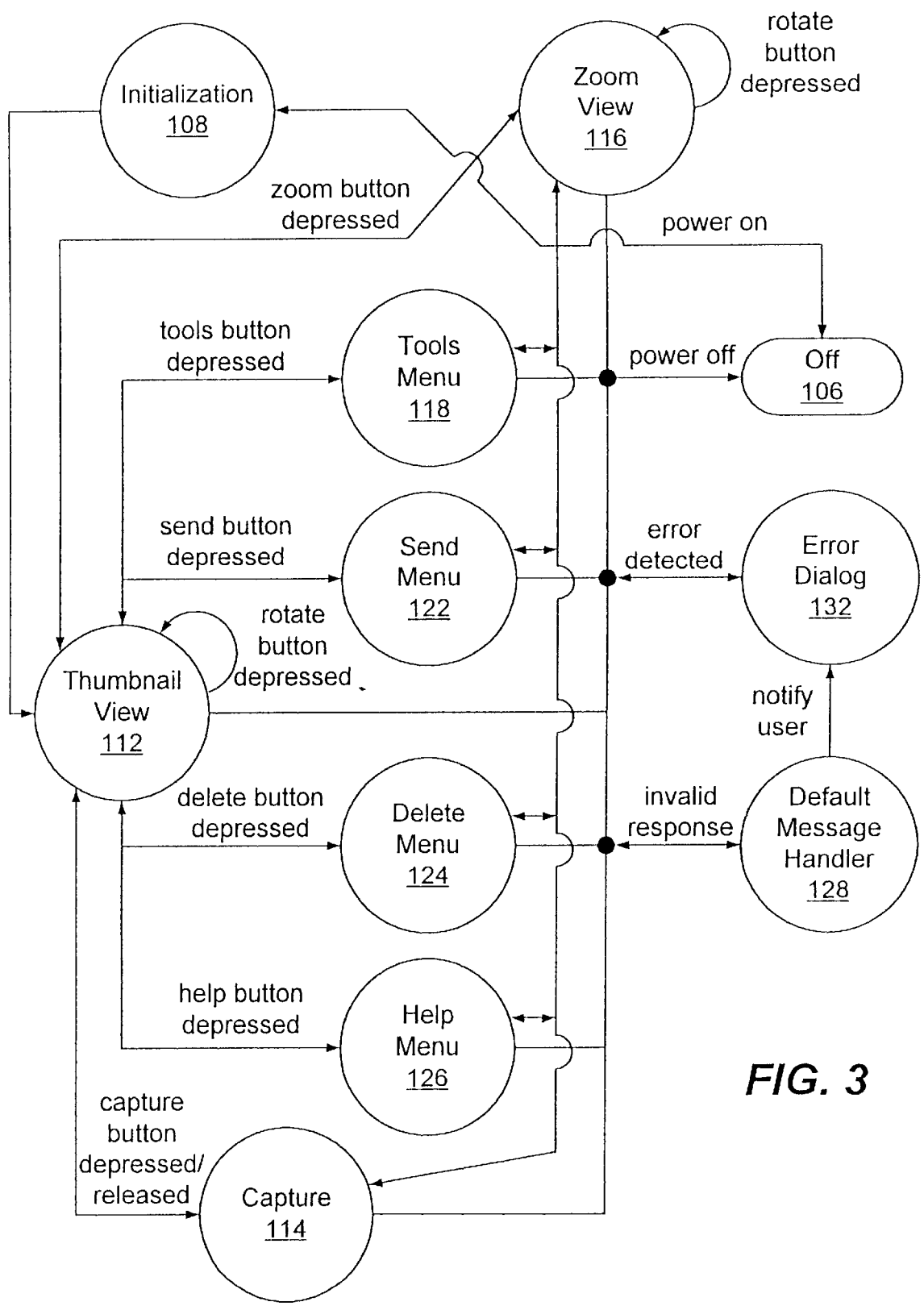
FIG. 3 is a high-level state diagram of the application software of FIG. 2.
Figure 4:
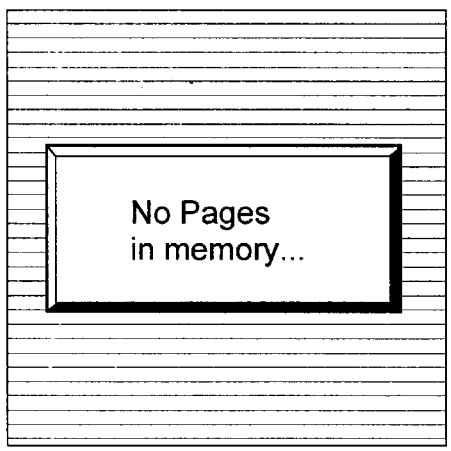
FIG. 4 depicts a memory usage indicator on the display screen of FIG. 1A that provide a memory utilization report for the appliance indicating no images are in memory.

A high level state diagram for application software 70 is shown in FIG. 3. This state diagram is useful for gaining a broad understanding of the operation of application software 70 and its associated software modules. These states are representative of tasks or processes in application software 70 that act on messages from a message queue, which are generated as a result of user interaction with appliance 22 (i.e., activation of buttons). Appliance 22 and application software 70 begin and terminate from the off state 106, which is controlled by the user through operation of power switch 56. Off state 106 can clearly be entered from any other state in response to a user turning appliance 22 off through switch 56. When a user turns switch 56 to the on position, the system will pass through a transient initialization state 108 during which time initialization module 76 is invoked to perform its functions. Once system initialization is complete, the system enters the thumbnail view state 112, which is the default state for viewing any captured images. From thumbnail view state 112, the system can transition to any one of several possible states depending on the action by the user. For example, the capture button can be pressed to enter capture state 114 to perform an image scan. After the image is captured, the button is released to return to thumbnail view state 112. If the user wishes to change the orientation of the captured image, then activation of rotation button 32 will rotate the captured image 90° with each invocation. Moreover, now that an image is captured in memory 64, a user can obtain a magnified view of a portion of the image or page by pressing zoom button 28 to enter zoom view state 116. Similar to thumbnail view state 112, the magnified image can also be rotated through application of rotation button 32. The system will return to thumbnail view state 112 through operation of zoom button 28 or performing certain actions such as capture, send, delete, attach, detach, etc. Additionally, the thumbnail view state 112 includes functionality for the empty (no images) state and the image verification state.

From thumbnail view state 112, one of four menu states can be entered depending on the choice made by the user. First, activation of tools button 38 will transition the system into tools menu state 118 where a menu of possible page operations and/or features is exhibited on display 24 as illustrated in FIGS. 8A and 8B. Second, activation of send button 26 will transition the system into send menu state 122 where a menu of options for transferring a page or group of pages to another appliance, device or system is exhibited on display 24. Third, activation of delete button 34 will transition the system into delete menu state 124 where a menu of options for deleting a page or group of pages from memory 64 is exhibited on display 24. Lastly, activation of help button 36 will transition the system into help menu state 126 where a menu of help topics is exhibited on display 24. Once any of the aforementioned menu states is reached, the user can choose a desired menu option by using navigation buttons 42 and 44 and then validating the choice by pressing a confirmation button. Menu states may be exited by simply invoking navigation button 46 to transition to a previous state.

From some states, an invalid response by the user (i.e., user presses an inactive button) will be ignored or will result in a transition to the default message handler state 128 where the user response is interpreted through the message that was generated internally and a transition is made to the error dialog state 132 to notify the user of their error via a message or graphic on display 24. Inactive buttons will occasionally also display a blinking icon to communicate to the user the selection of the inactive button and which buttons are active. Alternatively, error dialog state 132 can be entered directly if application software 70 detects an error in the execution of a valid operation. The most common example of this is when the user follows an improper capture path with appliance 22 during the image capture process.

The features provided by the thumbnail page view software module 82 will be described hereafter with frequent reference to (a) the architecture and operation of the application software 70 of FIG. 2; (b) the flowcharts of FIG. 13A, FIG. 13B and FIG. 13C; and (c) the captured screen illustrations of FIG. 4 through FIG. 12.

Operation of the Thumbnail Page View Interface and Method

Figure 5:
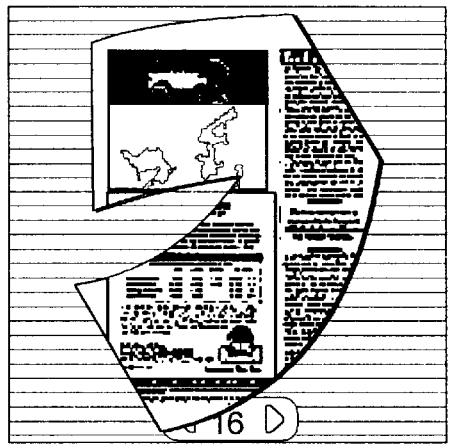
FIG. 5 illustrates a thumbnail view of an imperfectly captured image on the display screen of FIG. 1A.

Recall from the state diagram of FIG. 3 that when power is provided via switch 56 (FIG. 1C) application software 70 passes through a transient initialization state 108 to reach thumbnail view state 112, which is the default state for capturing images using capture button 54 and viewing images. Upon successfully capturing an image, the image is displayed as a thumbnail size icon as illustrated in FIG. 6 on the display 24 (FIG. 1A), together with a descriptor, also referred to as a license plate, which communicates the location which the image holds in memory with respect to other saved images. Directional arrows are also included on the license plate to communicate to the user which navigational buttons may be used to navigate among the images in memory. In the preferred embodiment, the thumbnail size image is scaled to $\frac{1}{24}$ the size of the original image and displayed on the display screen, however, it should be understood that any size reduction may be used while still obtaining with the spirit of the invention. This reduction in size affords the user an aerial view of the image as it appears in memory to verify a successful capture of the image. In some instances, a user may incorrectly use the appliance and not acquire the entire image as depicted in FIG. 5. The thumbnail view allows the user to easily recognize that the entire image was not captured and the process may need to be repeated without having to execute a close inspection. Once a user successfully captures and verifies an image (FIG. 6), a user may then closely inspect the image by zooming into a specific area of the thumbnail image using a metaphoric icon and increasing the area designated to a higher pixel resolution, depicted by FIGS. 7A through 7C.

From the thumbnail view state, the appliance may reach various other states, i.e. TOOLS MENU 118, SEND MENU 122, DELETE MENU 124, HELP MENU 126 where users interact with a menu or message box to operate the appliance in that state. ERROR DIALOG messages can be entered from any state. In all of the aforementioned states, the navigation buttons serve functions in conjunction with other operational buttons to enable the user to operate the appliance. In particular, a user may enter the TOOLS MENU state by depressing the tools button 38 (FIG. 1A). In this state the Tools Menu is displayed as depicted in FIGS. 8A and 8B, depending on whether or not the user is examining a grouped thumbnail. Specifically, this menu allows the user to attach and detach images with respect to groups as displayed in FIGS. 9A through 9C.

Figure 13A:
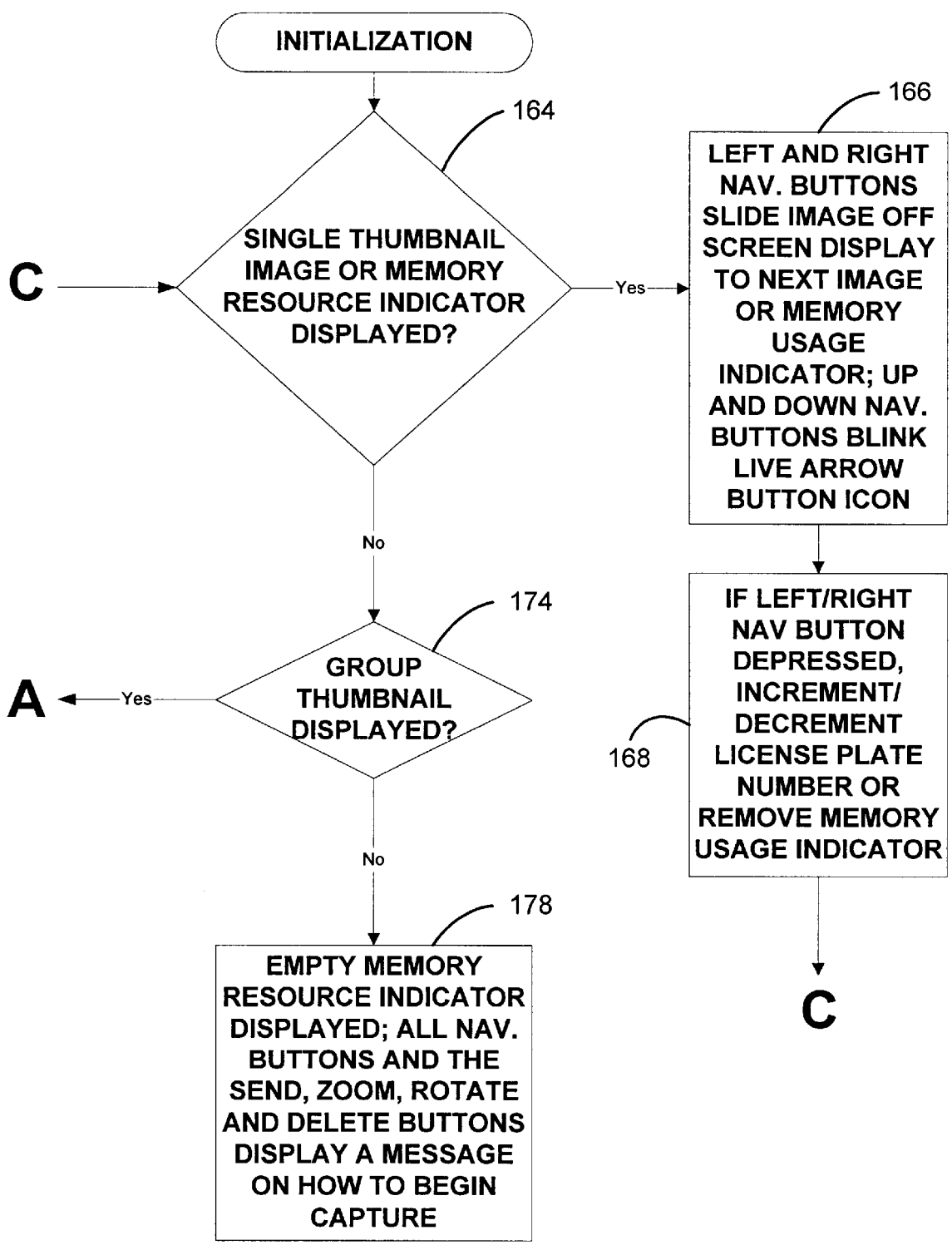
FIGS. 13A, 13B, and 13C are flowcharts describing the architecture and operation of the thumbnail page view software module of FIG. 2.
Figure 13B:
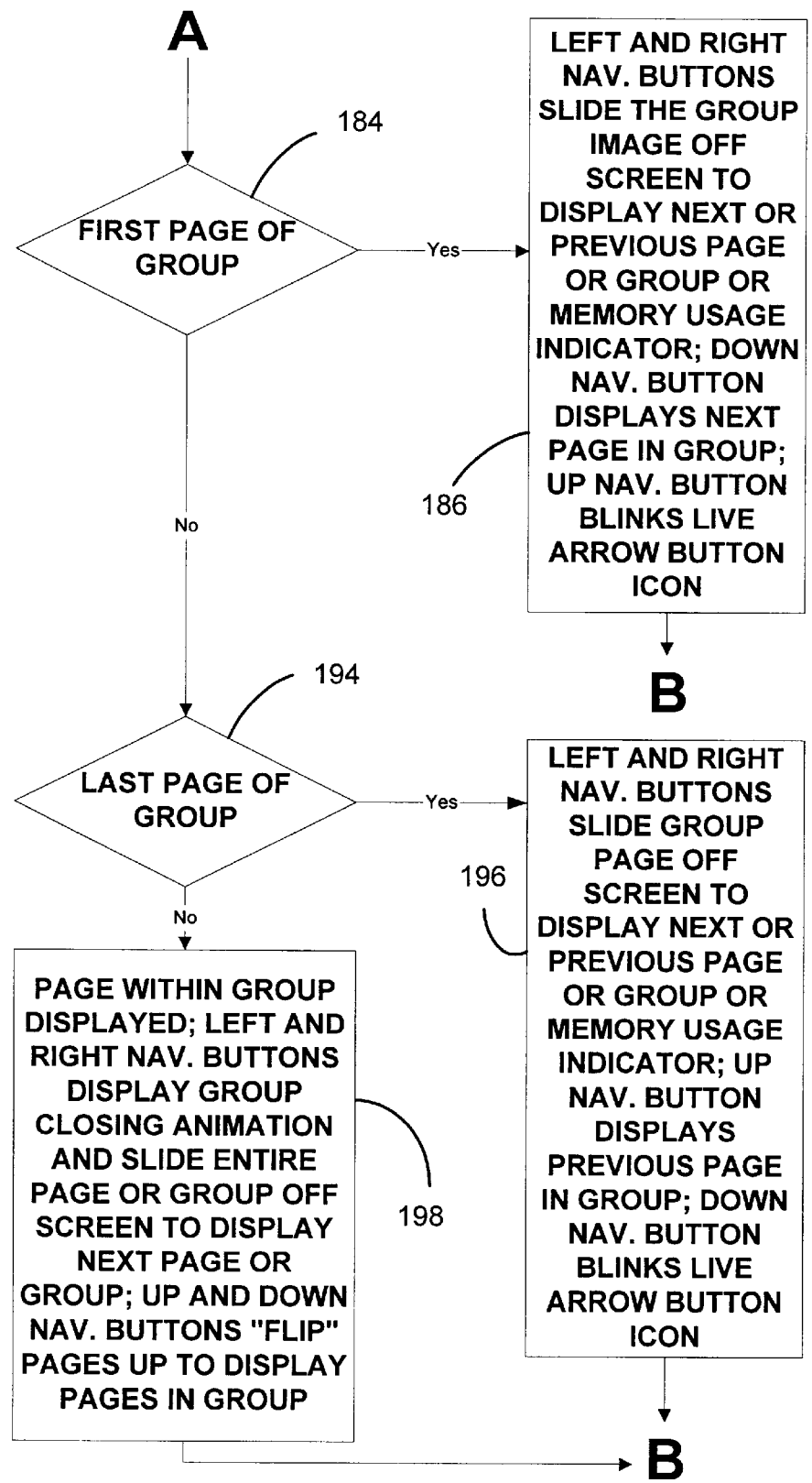

FIG. 13A, FIG. 13B and FIG. 1C are functional flowcharts detailing the operation of the navigation buttons within the thumbnail page view interface and method. In FIG. 13A, after initialization of the appliance at power up, logic determines whether a single (ungrouped) thumbnail image (FIG. 6) or a memory usage indicator (FIG. 12) is being displayed 164, or a grouped thumbnail image (FIG. 9A through FIG. 9C) is being displayed 174. If it is determined that the user is viewing neither, then the empty memory usage indicator is displayed informing the user that no pages are in memory (FIG. 4) 178. In that case, all of the navigation buttons 42, 44, 46, 48 (FIG. 1A) and the send 26, zoom 28, rotate 32 and delete 34 buttons (FIG. 1A) will cause a message to be displayed describing how the user is to begin an image capture 178. In the preferred embodiment, if a single thumbnail image is displayed, the left and right navigation buttons 46, 48 (FIG. 1A) will slide the image off the screen to the left or right 166. It should be understood that the up and down navigation buttons 42, 44 (FIG. 1A) could optionally be used to slide the image off the screen up or down. However, in the preferred embodiment, the up and down navigation buttons 42, 44 (FIG. 1A) will blink a live arrow button icon 166 located on the license plate as can be seen at the bottom of the screen in FIG. 6. When the left or right navigation buttons 46, 48 (FIG. 1A) are depressed, the license plate number is incremented or decremented indicating that the next or previous page or group in memory is being displayed 168. If another image is not stored at the next or previous memory location, a status memory usage indicator will be displayed informing the user of the number of pages stored and the amount of memory used and/or remaining (FIG. 12). If a group thumbnail image is being displayed 174, a determination of whether the displayed image is the first image in the group (FIG. 9A), the last image (FIG. 9C) in the group or an image within the group (FIG. 9B) is made. In one embodiment, the memory usage indicator is stored at the end of a sequence of image data stored in the memory of the appliance.

In FIG. 13B, a determination of whether the displayed image is the first image (FIG. 9A) in the group 184, the last image (FIG. 9C) in the group 194 or an image within (FIG. 9B) the group 198 is made. If the group image displayed is the first image (FIG. 9A) 184, the left and right navigation buttons 46, 48 (FIG. 1A) slide the group image off the screen to display the next (FIG. 11) or previous page or group (FIG. 6) or memory usage indicator (FIG. 12) in memory which is not in the group 186. The down navigation button 44 (FIG. 1A) displays the next image in the group 186. In the preferred embodiment, "flipping" animation is used to communicate to the user that the page flipped and the page displayed are within the same group. The up navigation button 42 (FIG. 1A) blinks a live arrow button icon. Similarly, if the last image (FIG. 9C) in the group is displayed 194, the up navigation button 42 (FIG. 1A) displays the previous image in the group (FIG. 9B) with the down navigation button 44 (FIG. 1A) blinking a live arrow button icon 196. If the image displayed is a page within a group 198, the functionality of all navigation buttons 42, 44, 46, 48 (FIG. 1A) are activated giving the user the ability to navigate the thumbnail images within the group. In all instances, additional logic is executed to display momentary icons to the user to communicate functionality.

Figure 13C:
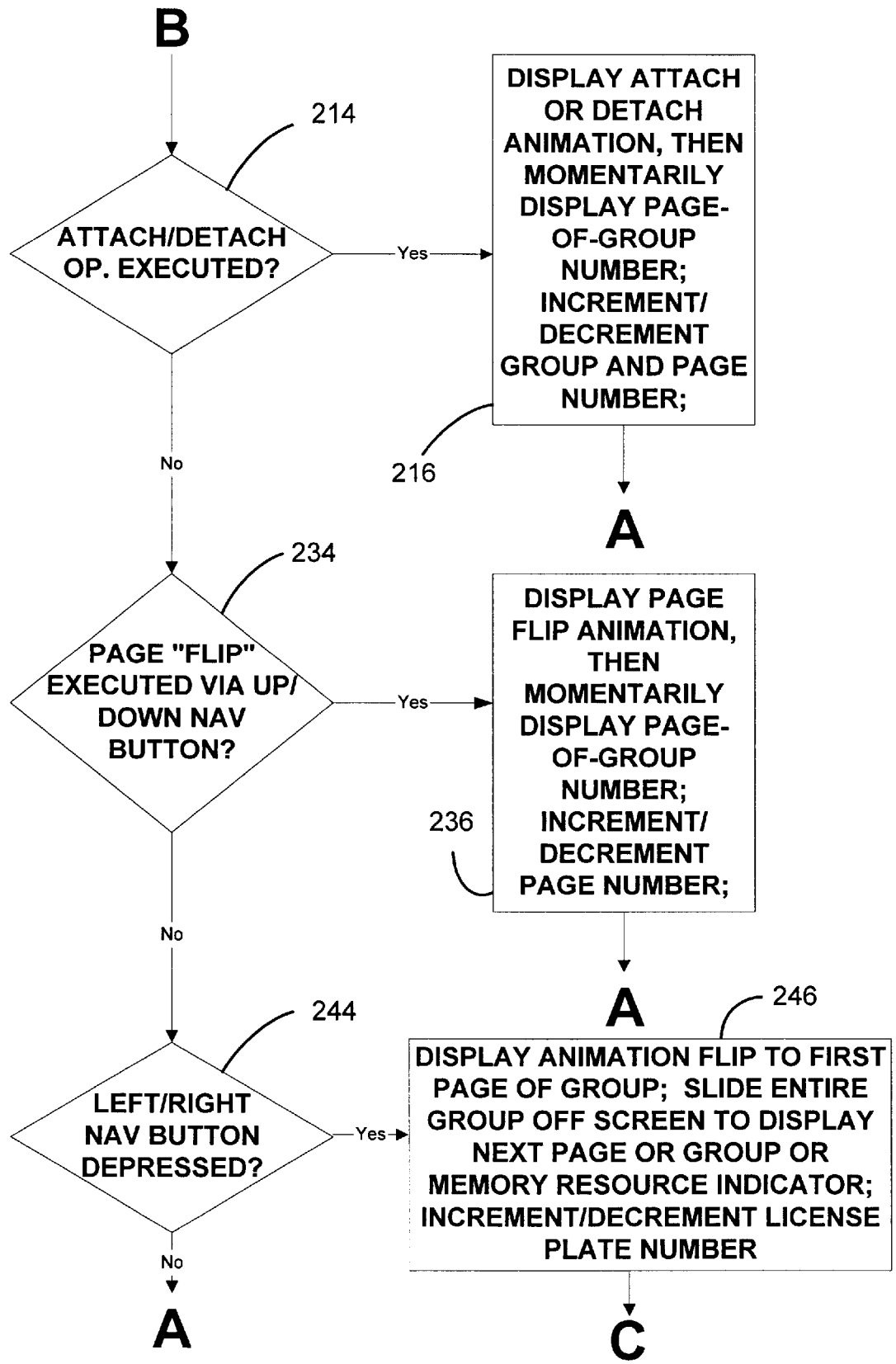

In FIG. 13C, logic checks to see if an attach or detach function (FIG. 8A and FIG. 8B) has been executed which will affect the number of images in the group 214. If an attach or detach command has been executed, the attach or detach animation is displayed, then a page-of-group number icon is momentarily displayed with the group and page number within this icon being incremented or decremented 216. If an image flip has been executed by using the up or down navigation buttons 234, the page flip animation is displayed, then a page-of-group number icon is momentarily displayed with the page number incremented or decremented 236. Finally, if the left or right navigation button 46, 48 (FIG. 1A) is depressed 244, animation is displayed of pages flipping back to the first page of the group and the opened group is automatically closed 246. The license plate number is then incremented or decremented 246 and the next or previous image not in the group is displayed. It is important to note that during navigation within a group, the license plate number is not incremented or decremented, but is only done so when navigating out of the group. This communicates that the images viewed are within a group, and are logically connected in some way.

With reference to the present invention communicating to the user the current location in memory, in an alternate embodiment of the present invention, the user may be displayed a two dimensional grid navigational window which shows the user the current image displayed with respect to all other images stored contiguously in memory. This function allows the user to instantly view any image stored in memory.

The thumbnail page view program 82 of the present invention can be implemented in hardware, software, firmware, or a combination thereof. In the preferred embodiment(s), the thumbnail page view program 82 is implemented in software or firmware that is stored in a memory 64 and that is executed by a suitable instruction execution system.

The thumbnail page view program 82, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory 64.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

What is claimed is:

1. A portable hand-held image capturing appliance, comprising:
    a photoelement array for acquiring at least a first image data and a second image data;
    a memory for saving said image data;
    a processor in communication with said memory;
    a display in communication with said processor for exhibiting one of said image data; and
    program code stored in said memory and executed by said processor for viewing one of said image data, said program code comprising a page view software module for viewing said image data on said display of said appliance, and for displaying an animated sequence on said display after ending display of said first image data and before displaying said second image data, wherein said animated sequence is said first image data sliding off said display.

2. The appliance of claim 1, wherein said image data is displayed on said display of said appliance in a reduced size.

3. The appliance of claim 1, wherein said image data is sequentially denoted with a descriptor which communicates the location which the image holds with respect to other saved images, said descriptor appearing on a license plate with said acquired image on said display of said appliance.

4. The appliance of claim 1, wherein if no said image data is stored in said memory, an empty memory usage indicator is displayed on said display.

5. The appliance of claim 3, wherein said descriptor denoting said image data is a number.

6. The appliance of claim 3, further comprising a two dimensional window displaying a reduced size of all said acquired image data.

7. The appliance of claim 3, wherein a second image data in said sequence is displayed on said display upon a user request.

8. The appliance of claim 4, wherein said empty memory usage indicator is an icon informing the user that no image data is stored in memory.

9. The appliance of claim 3, wherein a normal memory usage indicator is stored at the end of said sequence of image data stored in said memory of said appliance.

10. The appliance of claim 9, wherein said normal memory usage indicator informs the user of the number of image data acquired in said memory.

11. The appliance of claim 9, wherein said normal memory usage indicator informs the user of the amount of said memory used to store said image data.

12. The appliance of claim 9, wherein said normal memory usage indicator informs the user of the amount of said memory used to store said image data.

13. A portable hand-held image capturing appliance, comprising:

a photoelement array for acquiring image data, said image data comprising at least a first image data and a second image data in an image collection;
    a memory for saving said image data;
    a processor in communication with said memory;
    a display in communication with said processor for exhibiting said image data; and
    program code stored in said memory and executed by said processor for viewing said image data, said program code comprising:
        a page view software module for viewing said image data in said image collection on said display of said appliance upon a user request, with a descriptor which sequentially numbers each image data in the image collection, and with a number representing a total number of image data in said image collection; and
        an attach page software module for grouping a plurality of said image data into said image collection, wherein said image collection closes before displaying an image not in said image collection, and wherein an animation of pages flipping to first page of said image collection is displayed prior to closing said image collection.

14. A method for viewing captured images on a display of a portable hand-held appliance, comprising the steps of:
    acquiring at least a first image and a second image with said appliance;
    storing said images in a storage medium of said appliance; and
    displaying an animated sequence on said display after ending display of said first image and before displaying said second image, wherein said animated sequence is said first image sliding off said display.

15. The method of claim 14, said displaying comprising displaying said acquired image in a reduced size.

16. The method of claim 14, further comprising denoting said acquired image with a descriptor which communicates the location which the image holds with respect to other saved images, said descriptor being displayed on a license plate with said acquired image on said display of said appliance.

17. The method of claim 14, further comprising displaying a second image on said display upon a user request.

18. The method of claim 14, further comprising informing the user of system resources available for acquiring said images.

19. The method of claim 15, wherein said reduced size is $1/24^{th}$ the size of the actual size of said acquired image.

20. The method of claim 18, wherein said informing is accomplished by displaying memory usage indicators including utilization information on said display.

21. The method of claim 17, wherein said animated sequence is of said image sliding off said display.

22. A method for viewing captured images on a display of a portable hand-held appliance, comprising the steps of:
    acquiring a plurality of images with said appliance;
    storing said images in a storage medium of said appliance;
    displaying said images on said display of said appliance upon a user request;
    attaching said plurality of said images into an image collection that can be collectively communicated;

labeling each of said images in said image collection with a descriptor which sequentially numbers each image in said image collection and which represents a total number of images grouped in said image collection;

displaying an animated sequence on said display before closing said image collection and displaying a second image not in said image collection, wherein said image collection closes before displaying an image not in said image collection.

23. The method of claim 22, further comprising displaying an animated sequence on said display before displaying a next sequential image in said image collection.

24. The method of claim 22, wherein said animated sequence is of flipping pages resulting in the first page of said image collection being displayed.

25. The method of claim 22, further comprising momentarily displaying said descriptor when one of said images is initially displayed on said display.

26. A computer-readable medium having a program for manipulating image data acquired by a hand-held image capturing appliance, said program comprising:

logic configured for viewing multiple image data on a display;

logic configured to keep track of multiple image data stored in a memory;

logic configured for displaying animation in communicating navigation among multiple image data stored in said memory; and logic configured for displaying an animated sequence on said display after ending display of a first image and before displaying a second image of said multiple image data, wherein said animated sequence is said first image sliding off said display.

\* \* \* \* \*